(12) United States Patent
Kosmider et al.

(10) Patent No.: US 6,368,388 B1
(45) Date of Patent: Apr. 9, 2002

(54) FILTER CONSTRUCTION APPARATUS AND METHOD

(75) Inventors: Kristofer Kosmider, Bloomington; James A. Severson, Hastings; Thomas D. Raether, St. Louis Park; Robert M. Bick, Eagan; Steven Johnson, Burnsville, all of MN (US)

(73) Assignee: Donaldson Company Inc., Minneapolis, MN (US)

( * ) Notice: Subject to any disclaimer, the term of this patent is extended or adjusted under 35 U.S.C. 154(b) by 0 days.

(21) Appl. No.: 09/645,627

(22) Filed: Aug. 24, 2000

(51) Int. Cl.$^7$ .............................................. B01D 46/00
(52) U.S. Cl. ............................ 95/273; 55/490; 55/496; 55/502; 55/506; 55/508; 55/510
(58) Field of Search ............................... 95/273; 55/490, 55/493, 496, 497, 498, 500, 502, 503, 506, 507, 508, 509, 510, 511, 521, 525, 529, 484

(56) References Cited

U.S. PATENT DOCUMENTS

| | | | |
|---|---|---|---|
| 3,186,147 A | * | 6/1965 | O'Dell ........................ 55/506 |
| 3,204,390 A | * | 9/1965 | Heyl .......................... 55/341.7 |
| 3,237,463 A | | 3/1966 | McPherson |
| 4,171,963 A | | 10/1979 | Schuler |
| 4,218,227 A | | 8/1980 | Frey |
| 4,395,269 A | | 7/1983 | Schuler |
| 4,424,070 A | | 1/1984 | Robinson |
| 4,436,536 A | | 3/1984 | Robinson |
| 4,443,237 A | | 4/1984 | Ulvestad |
| 4,445,915 A | | 5/1984 | Robinson |
| 4,452,616 A | * | 6/1984 | Gillingham et al. .......... 55/484 |
| 4,820,320 A | * | 4/1989 | Cox ............................ 55/508 |
| 4,954,255 A | | 9/1990 | Müller et al. |
| 4,955,996 A | * | 9/1990 | Edwards et al. .............. 55/498 |
| 5,062,872 A | * | 11/1991 | Williams ...................... 55/481 |
| 5,173,186 A | * | 12/1992 | Spafford et al. .............. 55/502 |
| 5,207,812 A | | 5/1993 | Tronto et al. |
| 5,211,846 A | | 5/1993 | Kott et al. |
| 5,222,488 A | | 6/1993 | Forsgren |
| 5,562,746 A | | 10/1996 | Raether |
| 5,599,364 A | * | 2/1997 | Hawkins ...................... 55/508 |
| 5,746,796 A | * | 5/1998 | Ambs et al. .................. 55/493 |
| 5,803,954 A | * | 9/1998 | Gunter et al. ................. 55/484 |
| 6,090,173 A | | 7/2000 | Johnson et al. |
| 6,214,077 B1 | * | 4/2001 | Bitner et al. .................. 55/490 |

* cited by examiner

*Primary Examiner*—Duane Smith
*Assistant Examiner*—Jason M. Greene
(74) *Attorney, Agent, or Firm*—Merchant & Gould PC

(57) ABSTRACT

A filter construction allowing easy access to the filter is provided. The filter construction includes a yoke having a keeper, a filter supported by the yoke wherein the filter defines an opening, and a cover. The cover includes a plate for covering the opening in the filter, a tightening member connected to the plate and a catch for engaging the keeper on the yoke. An air filter assembly is also provided for removing particulate matter from an incoming dirty air stream. The assembly includes a housing having an inlet, an outlet, a dirty air chamber and a clean air chamber and a first filter construction positioned in the dirty air chamber. A method of accessing an air filter in an air filter assembly is also provided.

23 Claims, 15 Drawing Sheets

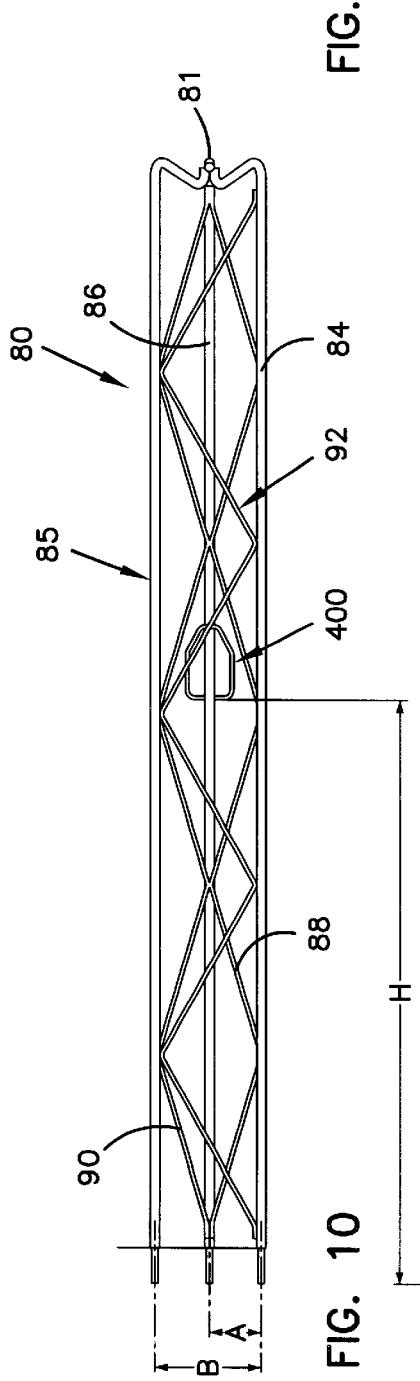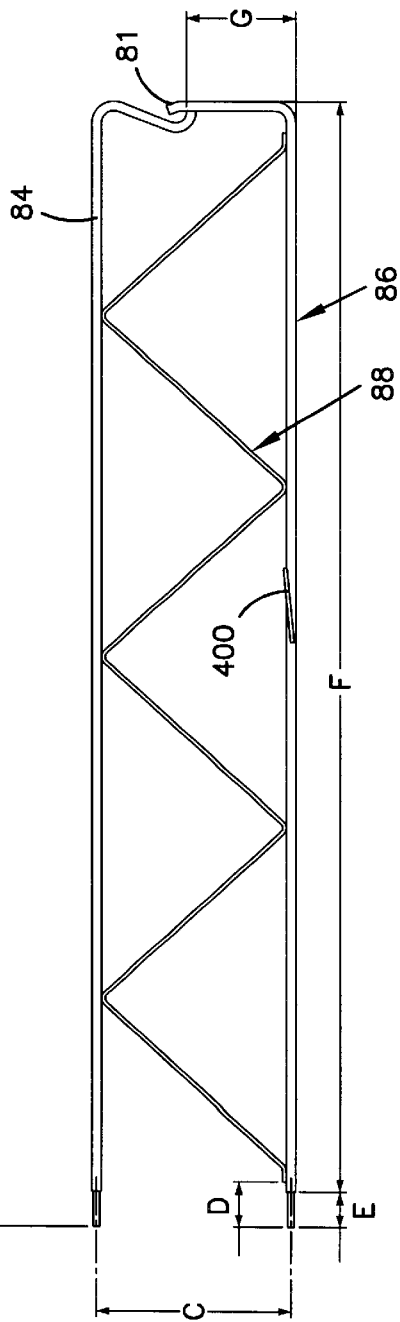
FIG. 9
FIG. 10
FIG. 11

FILTER CONSTRUCTION APPARATUS AND METHOD

FIELD OF THE DISCLOSURE

The present disclosure is generally related to air filtering systems. The present disclosure is more particularly related to a yoke, filter and cover apparatus and a method of using a yoke, filter and cover apparatus for an air filtering system.

BACKGROUND OF THE DISCLOSURE

Many industries often encounter particulate matter suspended in the atmosphere. In some industries, this particulate matter is a valuable product, for example, starch; it would be beneficial if these suspended particulate could be recovered and reintroduced into the process. For other industries, such as metal or wood working, the particulate matter may be simply dust; it is desirable to remove dust particles from the air in order to provide a clean working environment.

Systems for cleaning an air or other gas stream laden with particulate matter include air filter assemblies that have filter elements disposed in a housing. The filter element may be a bag or sock of a suitable fabric or pleated paper. The gas stream, contaminated with particulate, typically is passed through the housing so that the particulate are captured and retained by the filter element. Cleaning is accomplished by periodically pulsing a brief jet of pressurized air into the interior of the filter element to reverse the air flow through the filter element, causing the collected contaminants to be collected . Such air filter assemblies are disclosed in, for example, U.S. Pat. No. 4,218,227 (Frey) and U.S. Pat. No. 4,395,269 (Schuler), which patents are hereby incorporated by reference.

Cylindrical filter elements are usually used in an air filter assembly to process dust particles from an air stream. In a standard design of air filter assembly, an air filter assembly has a clean air chamber and a dirty air chamber. The two chambers are separated by a sheet metal, commonly referred to as a tube sheet. The tube sheet has a number of openings from which cylindrical filters are aligned. The filters suspend downwardly with or without an angle from the tube sheet openings into the dirty air chamber. Particulate-laden air is introduced into the dirty air chamber, and the particulates collect onto the filter. The filtered air passes through the filters to the interior of the filters, and upwardly out through the openings in the tube sheet into the clean air chamber. From the clean air chamber, the cleaned air is exhausted into the environment, or recirculated for other uses. For example, U.S. Pat. Nos. 4,424,070 (Robinson), 4,436,536 (Robinson), 4,443,237 (Ulvestad), 4,445,915 (Robinson), 5,207,812 (Tronto et al.), 4,954,255 (Muller et al.), 5,222,488 (Forsgren), and 5,211,846 (Kott et al.) are prior art examples of prior art cylindrical filter elements of the pleated cartridge type.

Any particular filter assembly can have multiple filter constructions. The filter elements of a filter construction are supported by a frame or yoke which is attached to the tube sheet. The end of the filter is sealed with an access cover which is secured to the end of the yoke opposite the tube sheet.

It is periodically necessary to access the filter elements to determine whether maintenance or replacement of the filter elements is necessary. The replacement of used filter elements is a process that requires opening of the access cover, removal of the filter elements, placement of different filter elements on the yoke, and replacement of the cover in such a way to ensure the proper amount of tightening of the cover onto the filter element(s). There are typically many covers on a housing corresponding with the number of filter constructions in the filter assembly (e.g., 32 covers for 32 filter constructions in a single housing) and the above process must be performed for each cover.

Conventionally, the cover is attached to the yoke by a threaded aperture in the cover receiving a bolt attached to the plate on the yoke. See for example, U.S. Pat. No. 4,395,269. With this conventional design, it is difficult and cumbersome to locate the bolt in the threaded hole. Therefore, the process of accessing the filter is a time consuming process. Furthermore, there is no positive way to keep the cover on after totally loosening the threaded portions and the cover can fall to the ground if not securely held by the operator. It is also difficult to avoid over compressing the filters. The operator must be very careful to screw the cover onto the filter to just the proper tightness to avoid damaging the filters.

Oftentimes it is desirable to utilize filters that are not circular in cross section. For example, filters having an oval cross section are sometimes used. In filter constructions having multiple stacked filter elements, it is necessary to align non-circular cross section filter elements relative to one another. Without such alignment, the seal between adjacent filter elements may be broken. Conventionally, the alignment of adjacent filter elements is attempted by carefully sliding the filter elements onto the yoke in an aligned state. However, the filter elements often shift or rotate slightly on the yoke before the cover is tightened down.

SUMMARY OF THE DISCLOSURE

The construction and arrangement of the disclosed filter apparatus helps to overcome the problems of the prior art. In particular, the disclosure provides a filter construction having a yoke with a keeper on one end. A filter having an opening is supported by the yoke. The cover for sealing the opening in the filter includes a plate for covering the opening, a tightening member connected to the plate, and a catch having a first end movably connected to the tightening member and a second end configured to engage the keeper. The plate is sealed against the opening by operating the tightening member to reduce the distance between the plate and the catch while the catch and keeper are engaged.

The disclosure also provides an air filter assembly for removing particulate matter from an incoming dirty air stream. The assembly includes a housing having an inlet, an outlet, a dirty air chamber and a clean air chamber and a first filter construction as provided above positioned in the dirty air chamber.

A method of accessing an air filter in an air filter assembly is also provided.

BRIEF DESCRIPTION OF THE DRAWINGS

FIG. 9 is a top view of a yoke and an alignment element according to the principles of the present invention;

FIG. 10 is side view of a yoke and alignment element according to the principles of the present invention;

FIG. 11 is a front view of a yoke and alignment element according to the principles of the present invention;

DETAIL DESCRIPTION OF THE PREFERRED EMBODIMENT

Air filter assemblies generally include a housing that includes a dirty air inlet and a clean air outlet. A tube sheet or spacer wall within the housing separates a clean air chamber from a dirty air chamber. A filter or multiple filters are supported within the dirty air chamber. As the air passes through the filter(s) it is cleaned and then passes into the clean air chamber.

The housing of an air filter assembly can be made of any material that is capable of sealing the clean air and dirty air chambers. Typically sheet steel is used as the material of choice for the housing.

Figure 1:
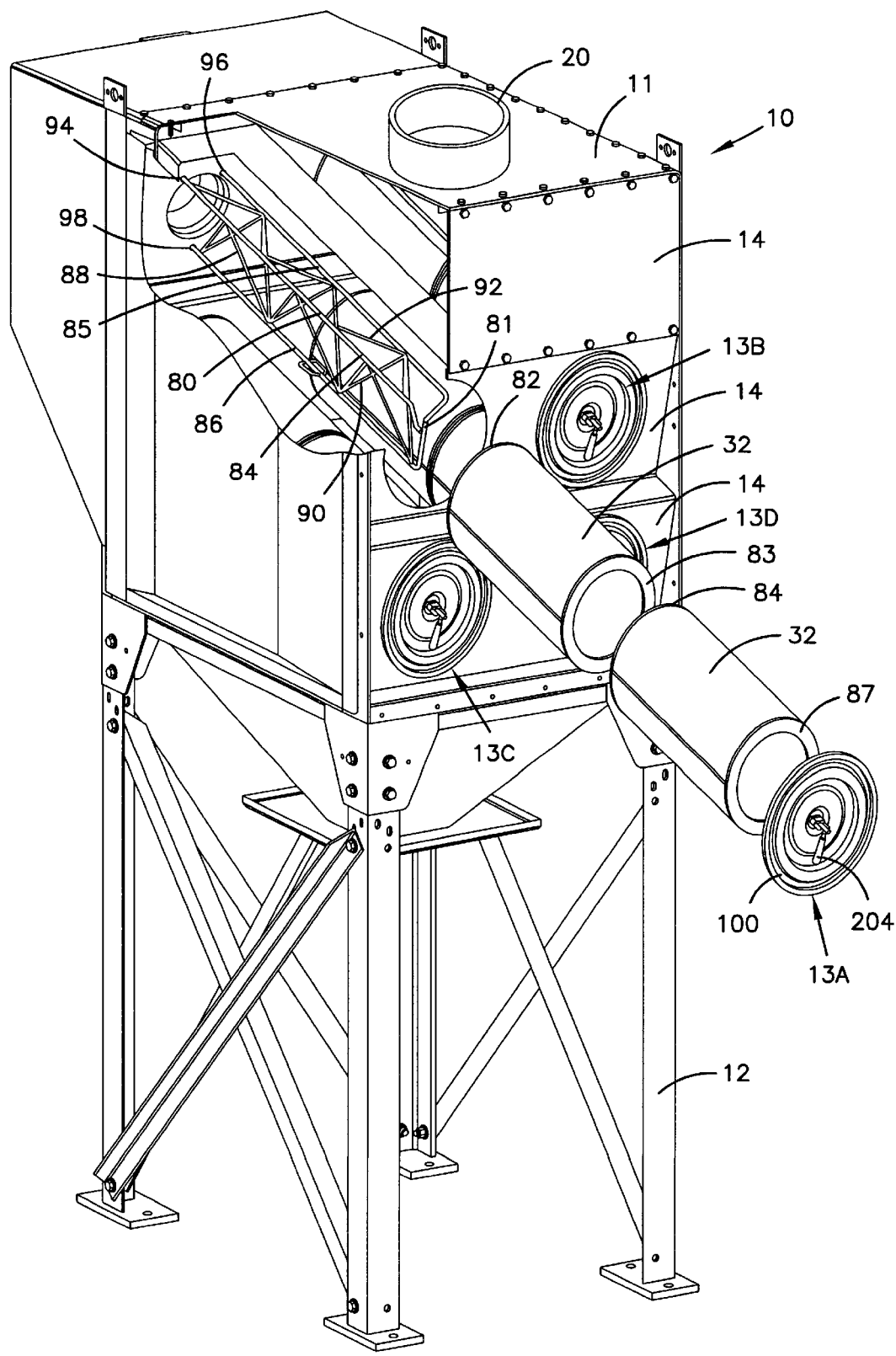
FIG. 1 is a perspective view of an air filter assembly according to the principles of the present invention with one set of filter elements shown in exploded view and with a cutaway of the housing to illustrate the yoke within the housing.

Referring to FIG. 1, an air filter assembly is depicted generally at 10. The particular air filter assembly shown in FIG. 1 includes a housing 11, a supporting frame 12 and four filter constructions 13a–d. The housing includes an air inlet 20 and an air outlet (not shown in FIG. 1, but reference numeral 64 in FIG. 2). The housing is of standard construction and is made of sheet steel.

Figure 2:
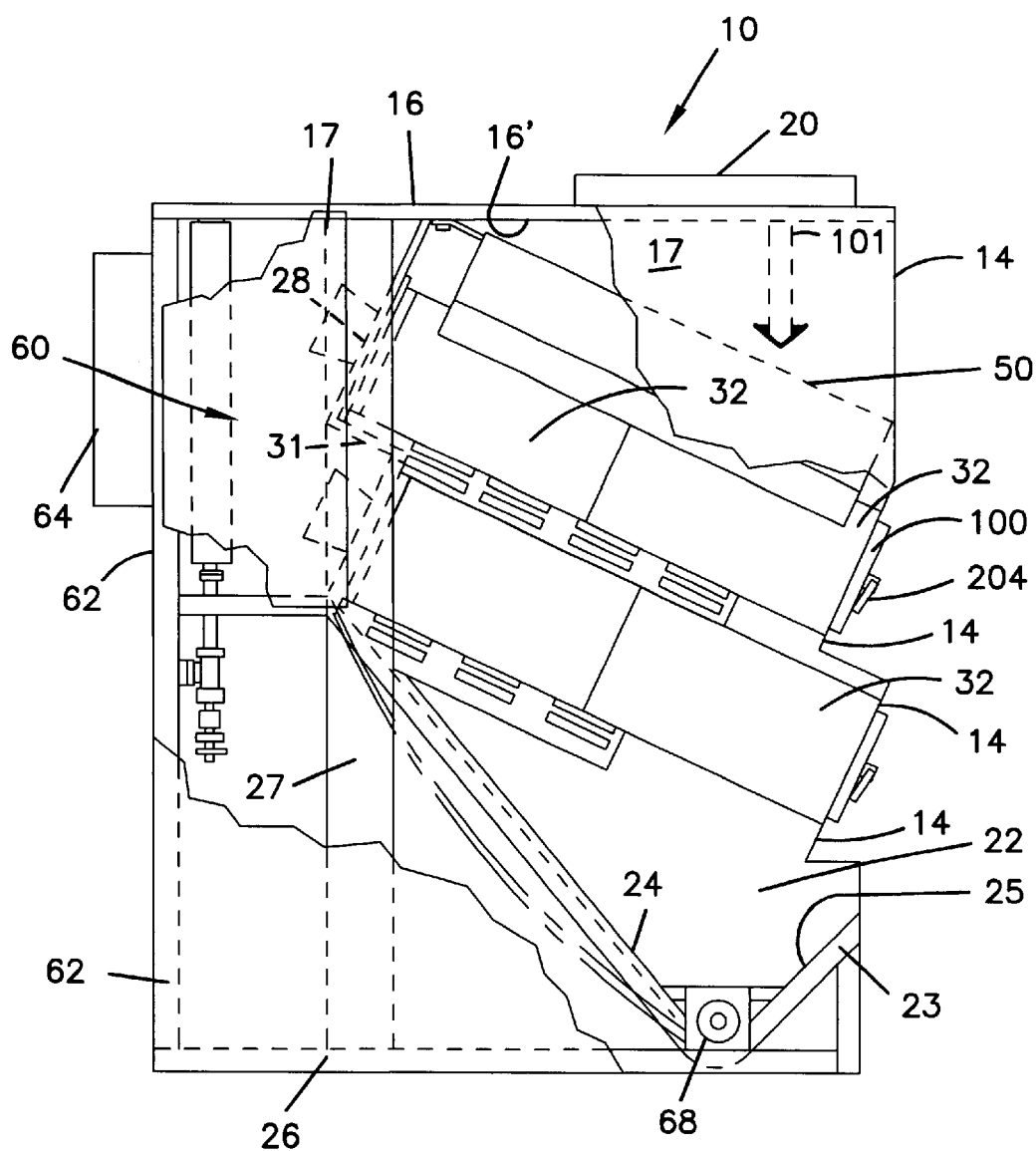
FIG. 2 is a side view of an air filter assembly according to the principles of the present invention with a cutaway of the housing.

Referring now to FIG. 2, the present disclosure is shown in side elevation with one side wall panel 17 being broken away to facilitate description of the arrangement of the various elements of the assembly. In this embodiment, the upper wall panel 16 has an inner wall surface 16' with an air inlet 20 positioned in the upper wall panel 16 so that entering dust-laden air or other contaminated gas is introduced in a downwardly direction (referred to as air flow direction 101) into a dirty air chamber 22. A typical volume of incoming dirty air is about 500 cubic feet per minute (cfm) for one conventional cylindrical filter element. In many industries where air filter assemblies of this type are installed, the amount of dust or other particulate contaminant in the dirty air stream is about one grain (0.0648 gram) of particulate per each cubic foot of air. Filtered or "clean air" typically has less than 0.001 grain particulate per each cubic foot of air. The top inlet 20 allows the assembly to utilize the forces of gravity in moving the dust particulate down through the assembly 10 to the collection area.

The dirty air chamber 22 is defined by the stepped front sheet 14, the upper wall panel 16, the two pairs of opposing side wall panels 17 which extend downwardly from the upper panel 16, stepped wall structure 28 (shown in phantom in FIG. 2), and a pair of sloping wall surfaces 23, 24. Sloping wall surfaces 23, 24 partially define a collection area or hopper 25 within the base portion of the assembly. The dirty air chamber 22 is a sealed chamber in order to prevent any escape of contaminated air or fluid prior to its being filtered. A bottom base panel or frame 26 is sealed to the side wall panels 17 in any suitable, standard manner.

Side panel 17 may be any structure suitable for enclosing and encasing dirty air chamber 22. Side panels 17 are typically planar sheets, made of, for example, metal or plastic.

Sealed to a structural frame member 27 along each of the side wall panels 17, 17' is mounted a spacer wall or tube sheet structure 28 to which are mounted the separate filter elements 32 of the assembly. The tube sheet structure 28 is sealed on all four of its sides to hermetically seal the dirty air chamber 22 from a clean air chamber 60.

In the embodiment shown, spacer wall or tube sheet structure 28 has a step-like design, although it is understood that planar tube sheet structures, or structures having other geometries, can be used. The structure 28 in the shown embodiment has three steps or indented portions. Each step portion includes an upwardly extending back member 30 and a leg member 31 extending at right angles from the back member 30. The tube sheet structure 28 is preferably constructed from a single piece of sheet steel and thus, the individual step portions are continuous extensions of the step portion immediately above it and below it.

Directly behind the tube sheet structure 28 is the clean air chamber 60 which is defined by the back surface panel 62 of the assembly and a portion of the upper surface panel 16, a portion of the two opposing side panels 17, 17', and the back side of the tube sheet structure 28. Mounted in the back surface panel 62 is a clean air outlet 64 for venting the clean, filtered air into the conduit 12 for return to the plant environment.

A filter can include one or more filter elements. Filter elements are any filter media that can remove particulates from the air. The filters illustrated in FIGS. 1 and 2 include two filter elements 32 (i.e. there are four filters within housing 11 and each filter has two filter elements 32). The individual filter elements 32 preferably are formed of pleated media, such as paper, formed into tube elements each having opposite ends. Each of these ends typically has an end cap thereon. The filter elements 32 shown in FIG. 1 include end caps 82, 83, 84 and 87. Details of the construction of an example filter element and how the filter media is fashioned into a shape and confined with end caps is disclosed in U.S. Pat. No. 4,171,963 (Schuler), which is incorporated herein by reference.

A filter element can have any cross sectional shape. Many filter elements are circular in cross sectional shape. It is also oftentimes desirable to utilize filter elements of an oval cross sectional shape. The filter elements 32 are oval in cross sectional shape.

As shown in FIG. 2, the filter elements 32 mounted to structure 28 are positioned in the dirty air chamber 22 in stepped, partially overlapping relationship. The filter elements 32 may be positioned in a generally downward direction at an acute angle of inclination with respect to the horizontal plane of the upper surface panel 16. In this manner, a distribution space 33 is defined in the uppermost portion of the filter assembly 10 by an inclined baffle 50, the side wall panels 17, 17', the upper wall panel inner surface 16', and front access door 13. The inclined baffle 50 is positioned to dissipate the incoming air flow throughout the dirty air chamber 22. As the dirty air enters the assembly 10 from the inlet 20, it is received into the distribution space 33 prior to its being filtered.

The filter elements are supported in the dirty air chamber by a yoke. A yoke is any device, frame or supporting structure coupled or connected to the housing which supports one or more filter elements.

FIG. 1 illustrates a preferred embodiment of a yoke at reference numeral 80. Yoke 80 includes two top rods 84 and 85, a bottom rod 86 and a truss including truss sides 88 and 90 and truss top 92. The yoke 80 is preferably made by forming and welding the steel rods 84, 85, and 86 and steel truss members 88, 90 and 92. The two top rods 84 and 85 and the bottom rod 86 are supported by the truss. The truss members 88, 90 and 92 are welded to the rods 84, 85 and 86. The end of the yoke 80 nearest the tube sheet structure 28 is secured to the tube sheet structure 28 by any number of methods including welding or via a nut threadedly engaged onto the ends of the yoke 80. The tube sheet structure 28 contains three holes 94, 96 and 98 for receiving the ends of the two top rods 84 and 85 and bottom rod 86.

The end of the yoke 80 opposite its attachment to tube sheet structure 28 includes a keeper 81 for engagement with a catch on a cover (described below). A keeper is any device or protrusion that is capable of holding onto or engaging with another device referred to below and defined below as a catch. A keeper can be a simple rod or post. A keeper can be a more complicated shape such as U, V, J, L, or D shapes, or any other shape that is capable of performing the above described purpose.

Figure 13:
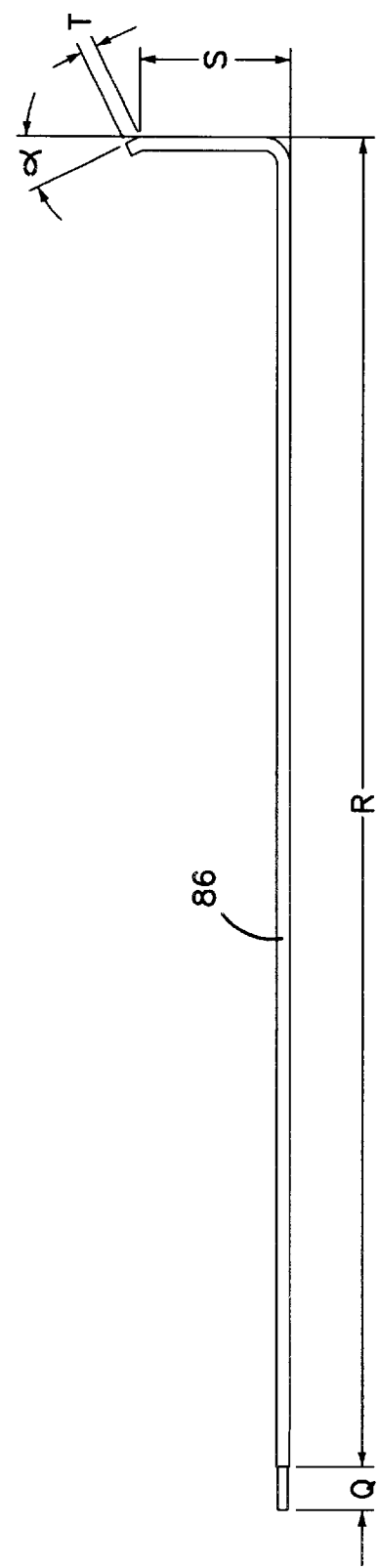
FIG. 13 is a side view of a bottom rod for a yoke according to the principles of the present invention.

In a preferred embodiment, the keeper is the keeper 81 which is the end of the bottom rod 86 that is opposite the end attached to structure 28. The keeper 81 is illustrated most clearly in FIGS. 10, 11, and 13. As shown in FIG. 13, the keeper 81 includes a bend (x of approximately 20 degrees in the direction away from the front sheet 14. Further details of the keeper 81 and its interaction with a catch will be described below.

Figure 4:
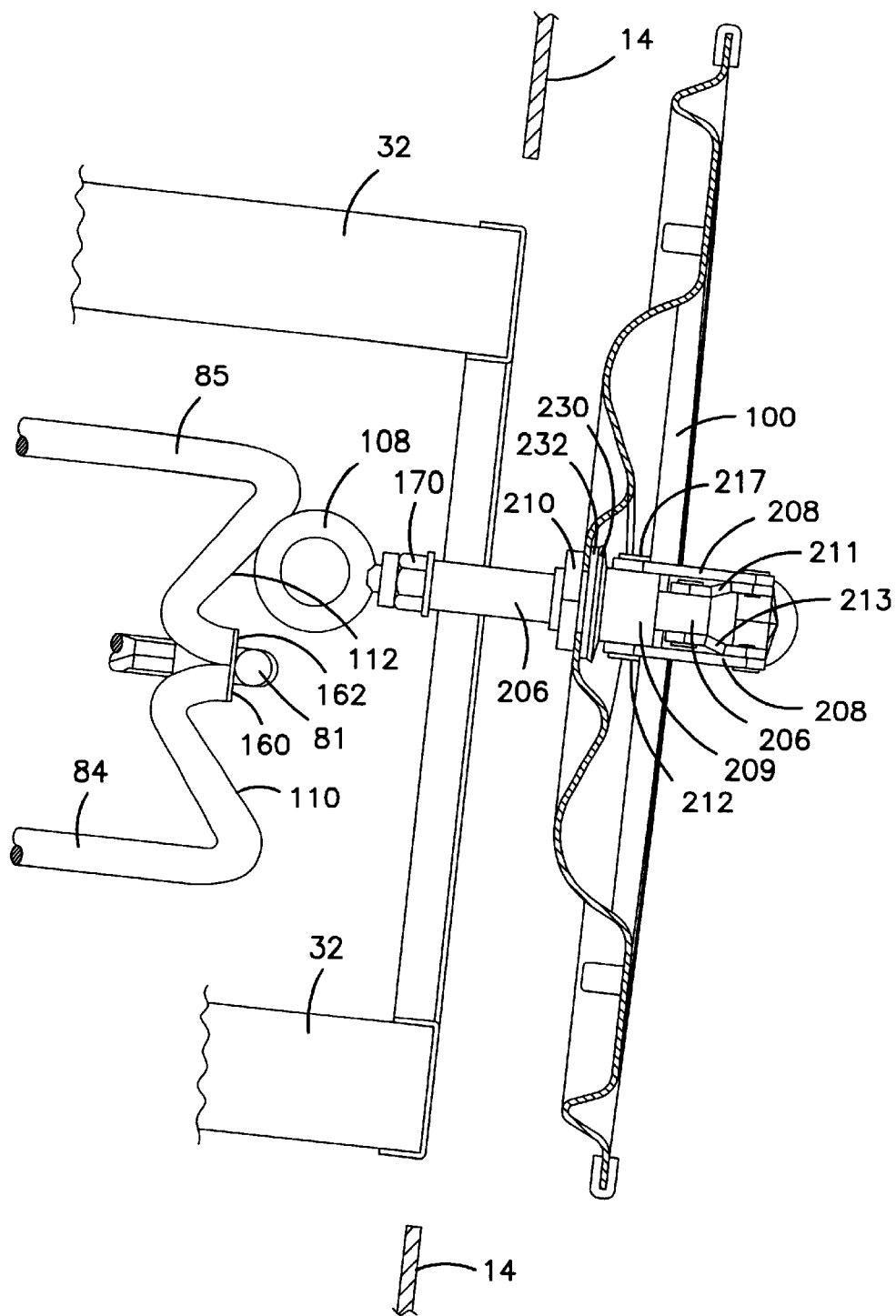
FIG. 4 is a top view of a portion of a filter construction according to the principles of the present invention.
Figure 5:
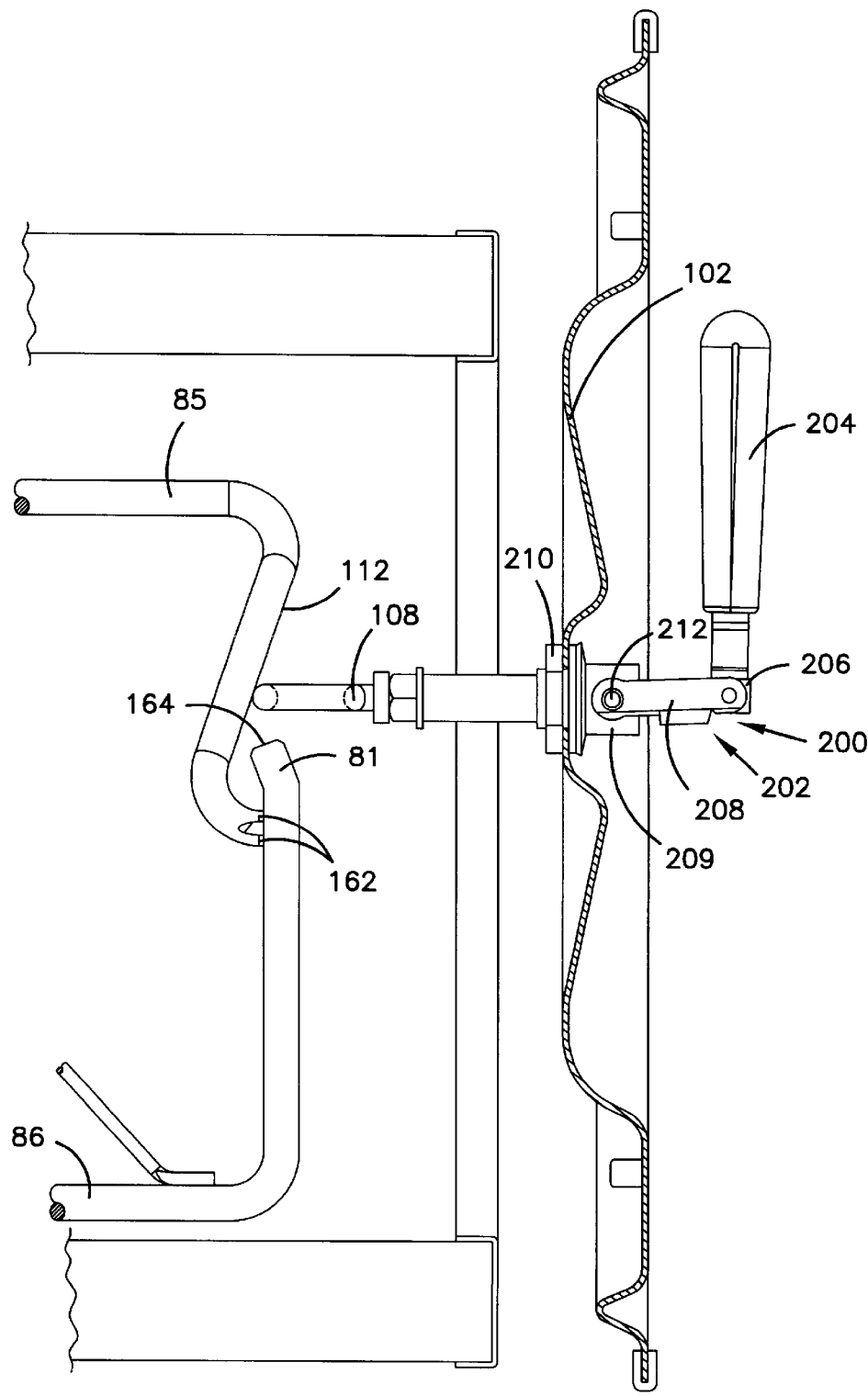
FIG. 5 is a side view of a portion of a filter construction according to the principles of the present invention.

As shown in FIGS. 4 and 5, the ends 160 and 162 of the top rods 84 and 85 are secured to the bottom rod 86 sufficiently below the end 164 of the bottom rod 86 to allow for an effective keeper 81. In a preferred embodiment the ends 160 and 162 are secured to the bottom rod 86 by welding.

The filter elements 32 slide over the yoke 80 in a stacked cooperation so that the end of the first filter element placed on the yoke 80 is in sealing contact with the tube sheet structure 28. The next filter element 32 placed on the yoke is placed in sealing contact with the first filter element 32 to form one continuous filter.

When mounted on the yoke 80, it is important that the filter elements 32 be sealed against each other and against the structure 28. In some embodiments a gasket may be disposed between the structure 28 and the end cap 82 of the first filter element 32. Gaskets may also be disposed between adjacent filter elements 32. By pressing the filter element(s) 32 toward the structure 28 and compressing the gaskets, an axially directed seal is provided between end cap 82 and structure 28 to prevent air leakage. A similar seal is provided between adjacent end caps of adjacent filter elements.

Each yoke 80 is secured essentially perpendicular to the structure 28 so as to suspend the filter elements 32 at an acute angle with respect to horizontal. (Back member 30, on which yoke assembly 36 is positioned, is at an angle to horizontal). In some embodiments, however, back member 30 may be vertical, i. e., perpendicular to horizontal, and yoke 80 is structured so that filter elements 32 are nevertheless positioned at an acute angle with respect to horizontal. The preferred range for the angle of inclination of the filter elements 32 is about 15°–30° from the horizontal, although the system can work with any angle of inclination, including no angle. In the embodiment shown in FIGS. 1 and 2, each back member 30 of the stepped structure 28 has two horizontally spaced apart yokes 80 mounted thereon. Preferably, all of the filter elements 32 on the various steps of stepped structure 28 are parallel to one another. For a planar tube sheet structure 28, the filter elements 32 are also preferably parallel to one another.

A cover is utilized to seal against the end cap 87 of the second filter element 32 and to provide the appropriate amount of compression of the filter elements. Too much compression can damage the filter elements and too little compression results in air leakage. A preferred embodiment cover is depicted in the Figures as reference numeral 100. The cover 100 and its interaction with the yoke will now be discussed.

A cover includes a plate or sealing member, a catch and a tightening member. A plate is a device capable of sealingly covering the end of the filter element. A plate could be flat. A preferred embodiment of a plate is shown as plate 102 of cover 100 in FIG. 3. Plate 102 is shaped to receive the end cap 87 of filter element 32. Plate 102 also includes a gasket 104 for sealing with end cap 87. Plate 102 also is shaped to sealingly interact with the front sheet 14. Plate 102 is made of sheet steel.

A catch is any device or configuration capable of physically holding onto another device such as a keeper or protrusion. A catch can be used to hold onto a keeper or protrusion such that a force can be applied to the catch to move the catch and therefore move the keeper or protrusion because of the engagement of the catch with the keeper. A catch can come in many different configurations and shapes. A catch can be shaped similarly to the letters U, V, J, L, D or any other shape that is capable of performing the above described purpose.

Figure 3:
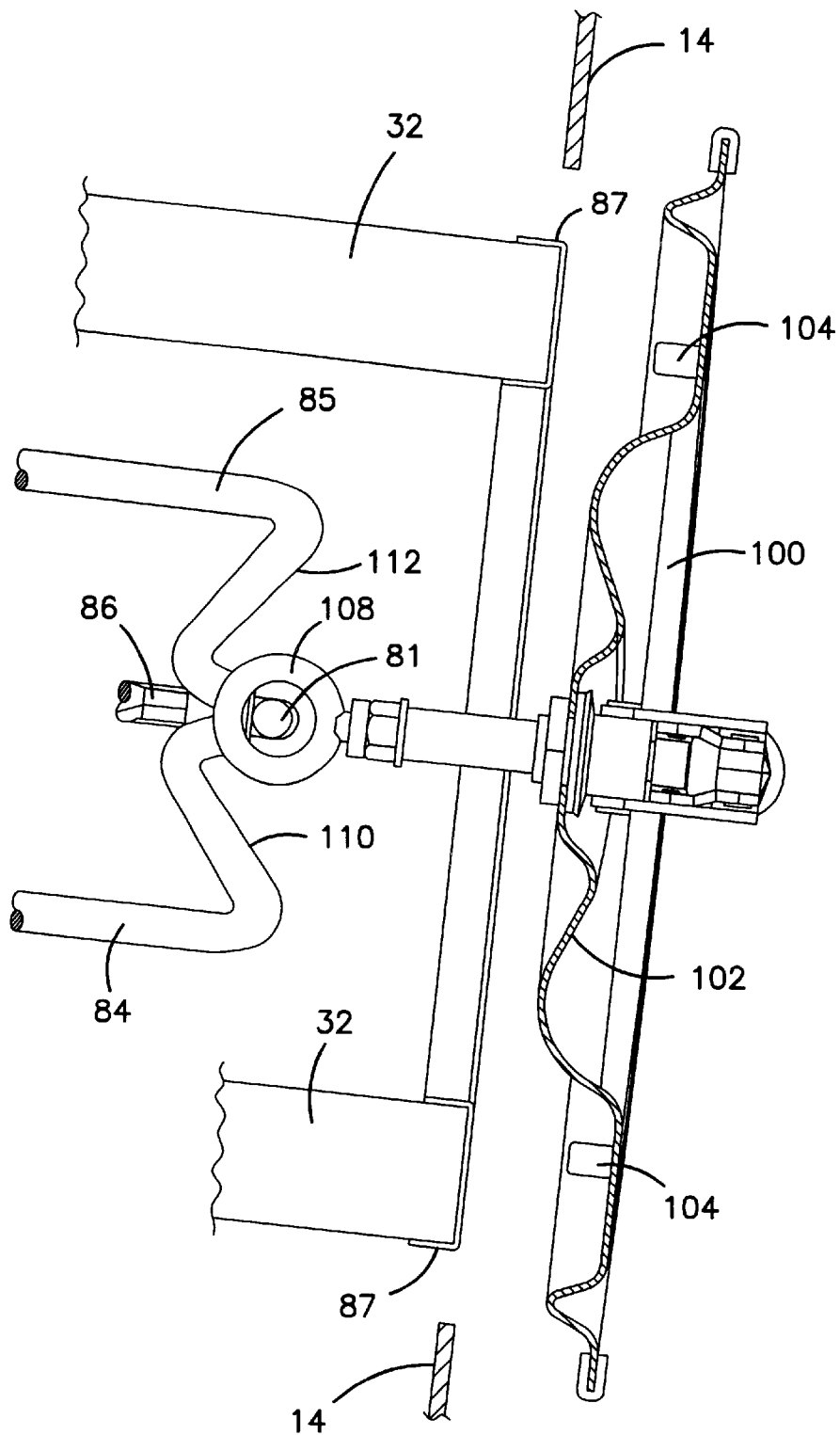
FIG. 3 is a top view of a portion of a filter construction according to the principles of the present invention.

In a preferred embodiment shown in FIG. 3, the catch 108 is the shape of the letter O, and is an eye bolt. The eye bolt is sized so that its central opening can receive the keeper 81 on the yoke 80. The circular shape of an eye bolt could also be cut out of a flat metal sheet to form a catch.

A guide surface is a surface that assists in the placement or positioning of a catch into engagement with a keeper. A guide surface could be a flat plate such that when the catch slides along the surface of the plate, the catch is directed in the direction of the keeper. A guide surface could be a ridge on a plate that so guides.

In a preferred embodiment as shown in FIGS. 3–12, the yoke 80 includes two guide surfaces 110 and 112. Guide surfaces 110 and 112 are angled rods that are shaped and positioned to direct the catch 108 into engagement with the keeper 81. The angled rods that make up the guide surfaces 110 and 112 are the two top rods 84 and 85 of the yoke 80. The operation of the guide surfaces 110 and 112 is described below.

Referring to FIG. 4, the catch 108 is shown off-center and above the keeper 81. This is an exemplary starting position of the catch 108 when the operator moves the cover 100 towards the end cap 87 to seal the filter construction. The catch 108 strikes the guide surface 112 causing, with the assistance of gravity, the catch 108 to move downward and laterally in the direction of the keeper 81. The shape of the guiding surface 112 is such that the catch slides directly onto the keeper 81. If the catch 108 moves laterally too far in the direction of guide surface 110, then the guide surface 110 assists in guiding the catch 108 back to a centered position where the catch 108 will slide down onto the keeper 81. It is noted that another exemplary starting position would place the eyebolt in contact with guide surface 110.

Figure 6:
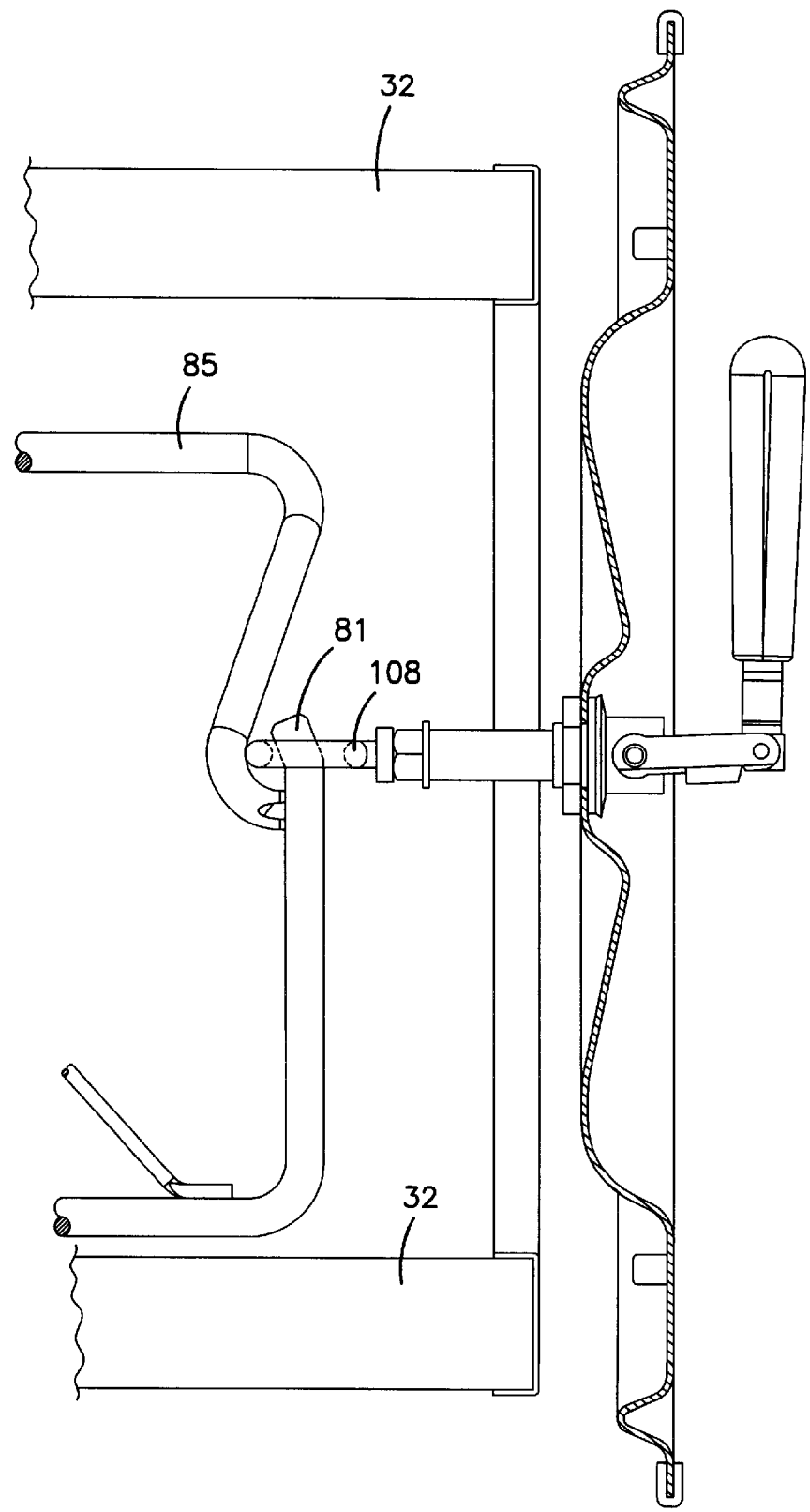
FIG. 6 is a side view of a portion of a filter construction according to the principles of the present invention.

FIG. 3 illustrates the catch 108 in an engaged position with the keeper 81. FIG. 5 is a side view showing the catch 108 positioned above the keeper 81 and in guiding contact with the guide surface 112. FIG. 6 is a side view showing the catch 108 lowered into engagement with the keeper 81.

As briefly mentioned above, a cover includes a tightening member. A tightening member is any device or mechanism that is coupled to a catch and a corresponding plate such that the tightening member is capable of changing the distance between the plate and the catch. A tightening member can be any type of clamp, bolt and nut combination, or other mechanism capable of adjusting the distance between the plate and the catch.

In a preferred embodiment as shown in FIGS. 1–7, the tightening member 200 is an over-center clamp 202. A preferred embodiment clamp is a straight line clamp made by DE-STA-CO Industries having Part No. 604-87. Referring to FIGS. 4 and 5, the over-center clamp 202 includes a rubber coated handle 204, a center bar 206, a link 208, arms 211 and 213 and a central support 209. The link 208 is secured to the support 209 by rivet 212 and a second rivet 217. The bar 206 passes through a hole centered in the plate 102 and through a hole in support 209. The eye bolt 108 is threaded into an aperture in the bar 206. A nut 210 couples the support 209 with the plate 102. The eye bolt 108 is screwed into the bar 206 to the desired position, and then the lock nut 170 is tightened down to maintain a constant distance between the eye bolt 108 and the plate 102. Reference number 230 refers to a gasket and reference number 232 refers to a washer.

Figure 7:
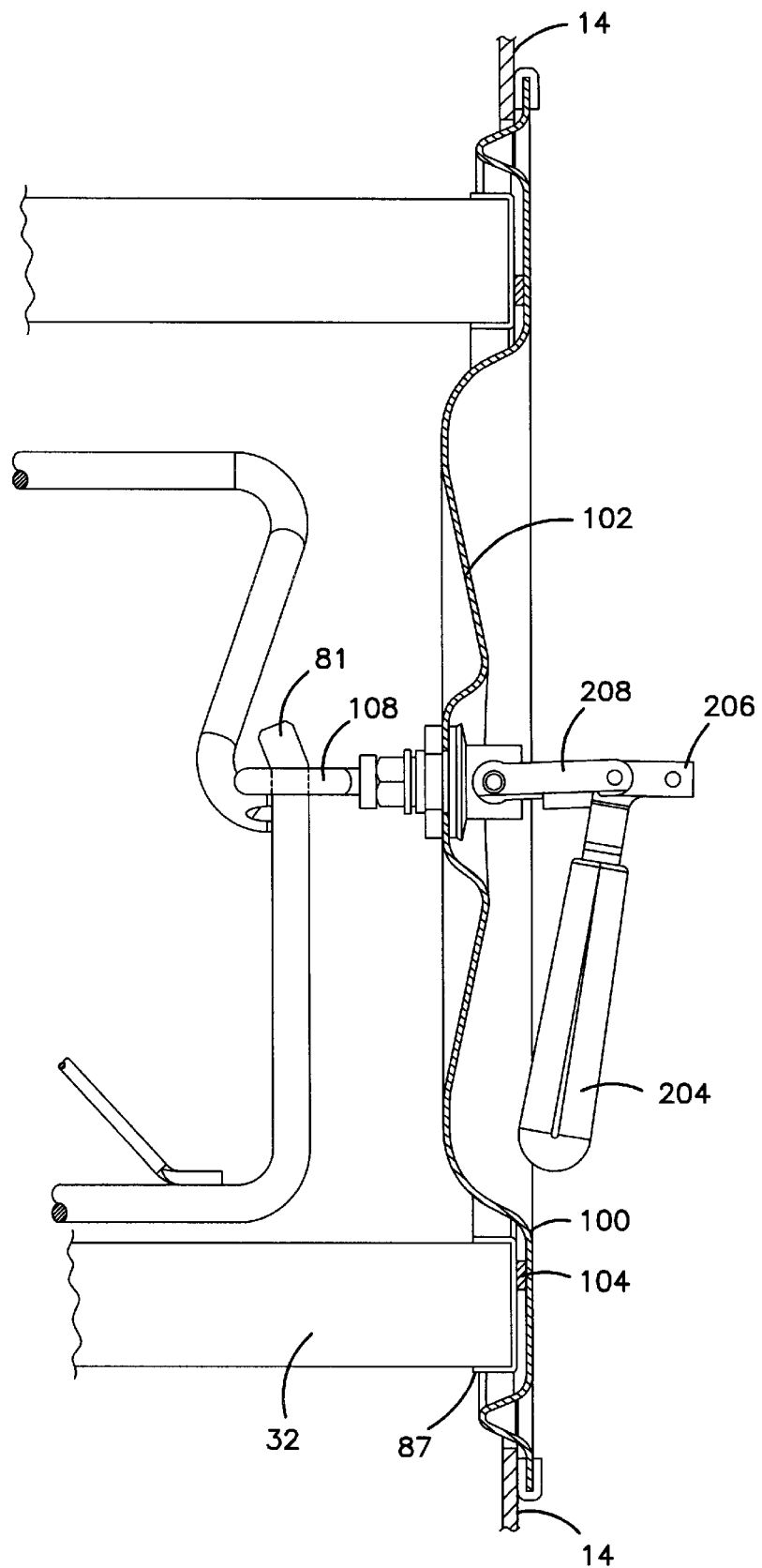
FIG. 7 is a side view of a portion of a filter construction according to the principles of the present invention with the handle of an over center clamp is in its closed position.

The handle 204 is connected to the bar 206 and is rotationally coupled to the link 208. Rotation of the handle 204 in the direction of the plate 102 results in movement of the bar 206 in the direction away from the keeper 81 of the yoke 80. Since the catch 108 is coupled to the bar 206, such rotation of the handle 204 results in the catch 108 moving toward the plate. If the catch is engaged with the keeper, the rotation of the handle 204 toward the plate causes tightening of the plate 102 onto the filter element 32 and the front surface 14 of the housing 11. FIG. 7 illustrates from a side view, the catch 108 engaged with the keeper 81, and the handle rotated into its closed position. The cover 100 in FIG. 7 is sealed against the end cap 87 of the filter element 32 and also against the front surface 14. The final position of the catch 108 relative to the keeper 81 can also be seen in FIG. 7.

As discussed above, the distance of the eye bolt 108 from the plate 102 can be adjusted by loosening the nut 170 and screwing the end of the eye bolt 108 further into or less distance into the bar 206. This is an important adjustment because it provides precision in the distance that the catch 108 moves relative to the plate 102 upon a given rotation of the handle 204. This adjustability is very helpful because it is important to provide an appropriate amount of compression of the filter elements 32. Too much compression of the filter elements 32 can damage the filter elements 32. Too little compression can result in air leakage. The use of an over-center clamp allows the operator to quickly seal the cover in place without worrying about providing too much or too little compression.

Figure 8:
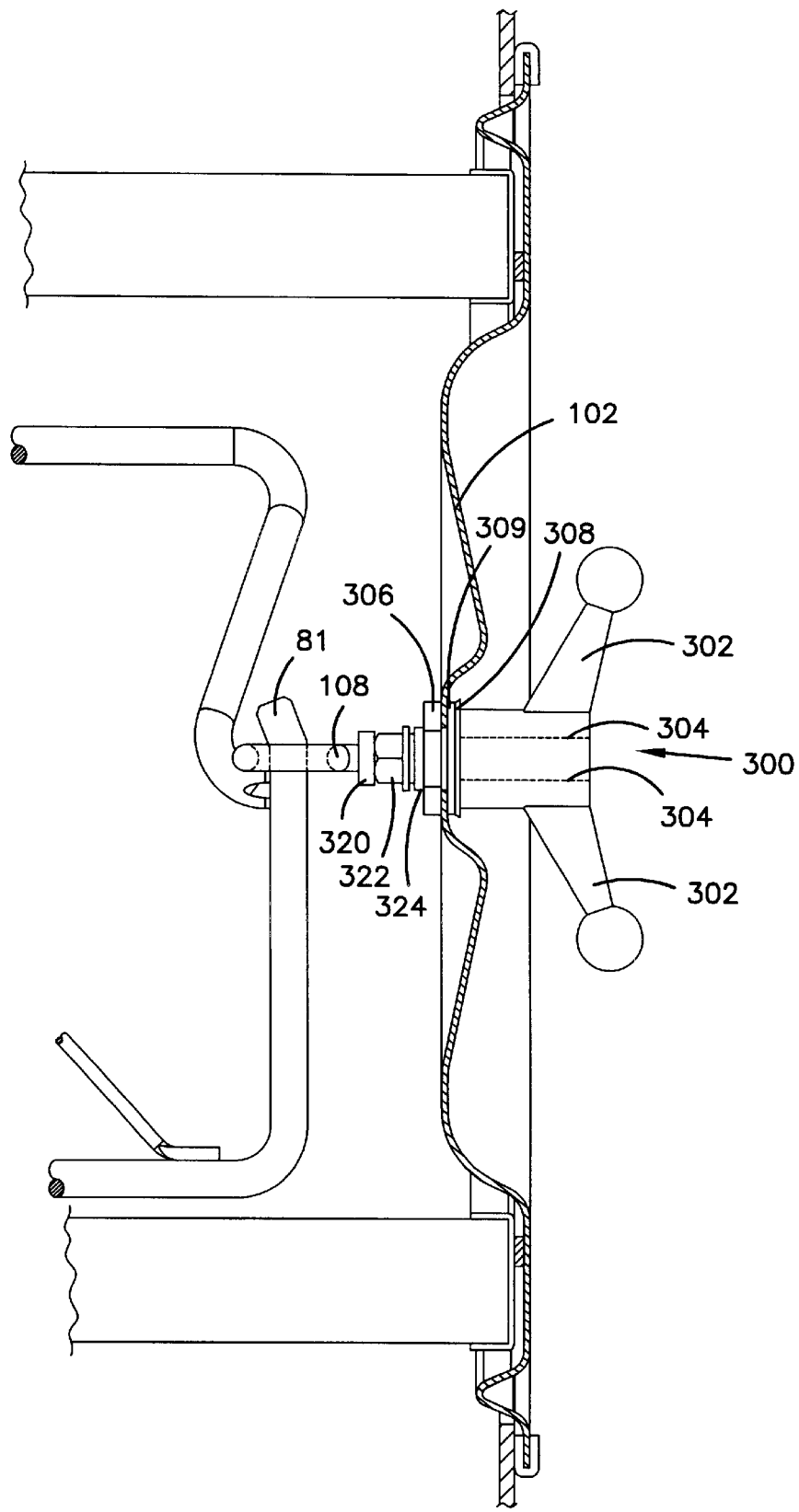
FIG. 8 is a side view of a portion of a filter construction according to the principles of the present invention.
Figure 12:
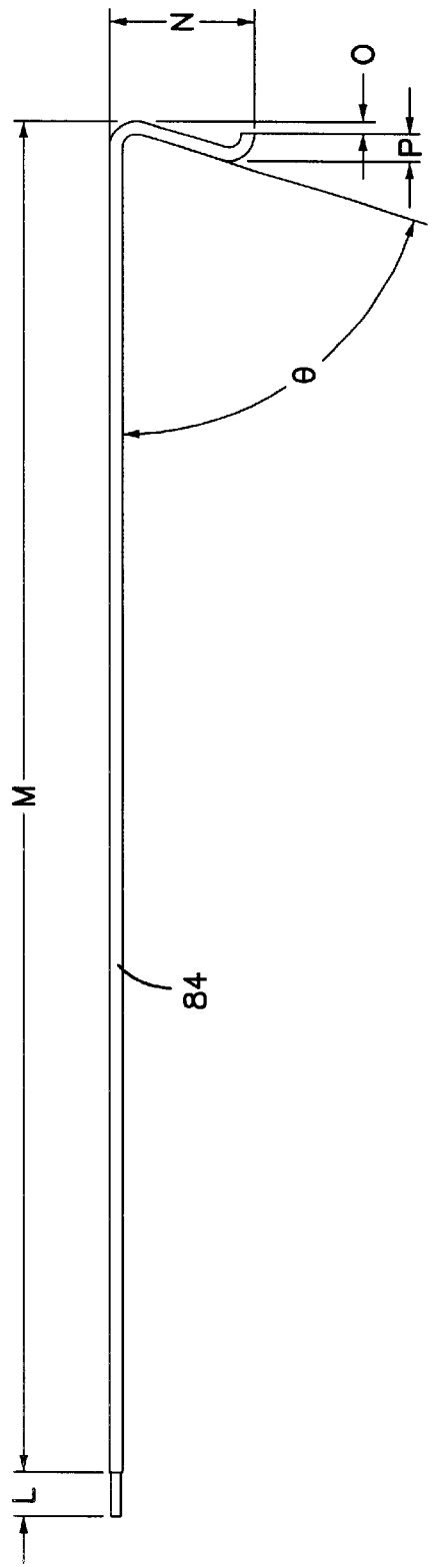
FIG. 12 is a side view of a top rod for a yoke according to the principles of the present invention.

FIG. 8 is a side view of another preferred embodiment of a tightening member. The tightening member includes a wing nut 300 that includes handle 302 with balls on the end for easy handling. Rod 324 includes a threaded outer diameter that is received by threaded aperture 304 in wing nut 300. Rod 324 also includes a female threaded aperture for threaded receipt of the end of the eye bolt 108 . Nut 306 is threadedly engaged with the threaded outer diameter of the rod 324 and prevents the wing nut 300 from falling away from the plate 102. Reference number 309 is a gasket and 308 is a washer. Nut 320 can be tightened to lock in the depth of insertion of the end of the eye bolt 108 into the female threaded aperture in the rod 324. Reference number 320 refers to a shoulder on the eye bolt 108 .

As the handle 302 is rotated clockwise, the catch 108 moves towards a closed position. When the handle 302 is rotated counter clockwise, the catch 108 moves toward an open position.

Figure 14:
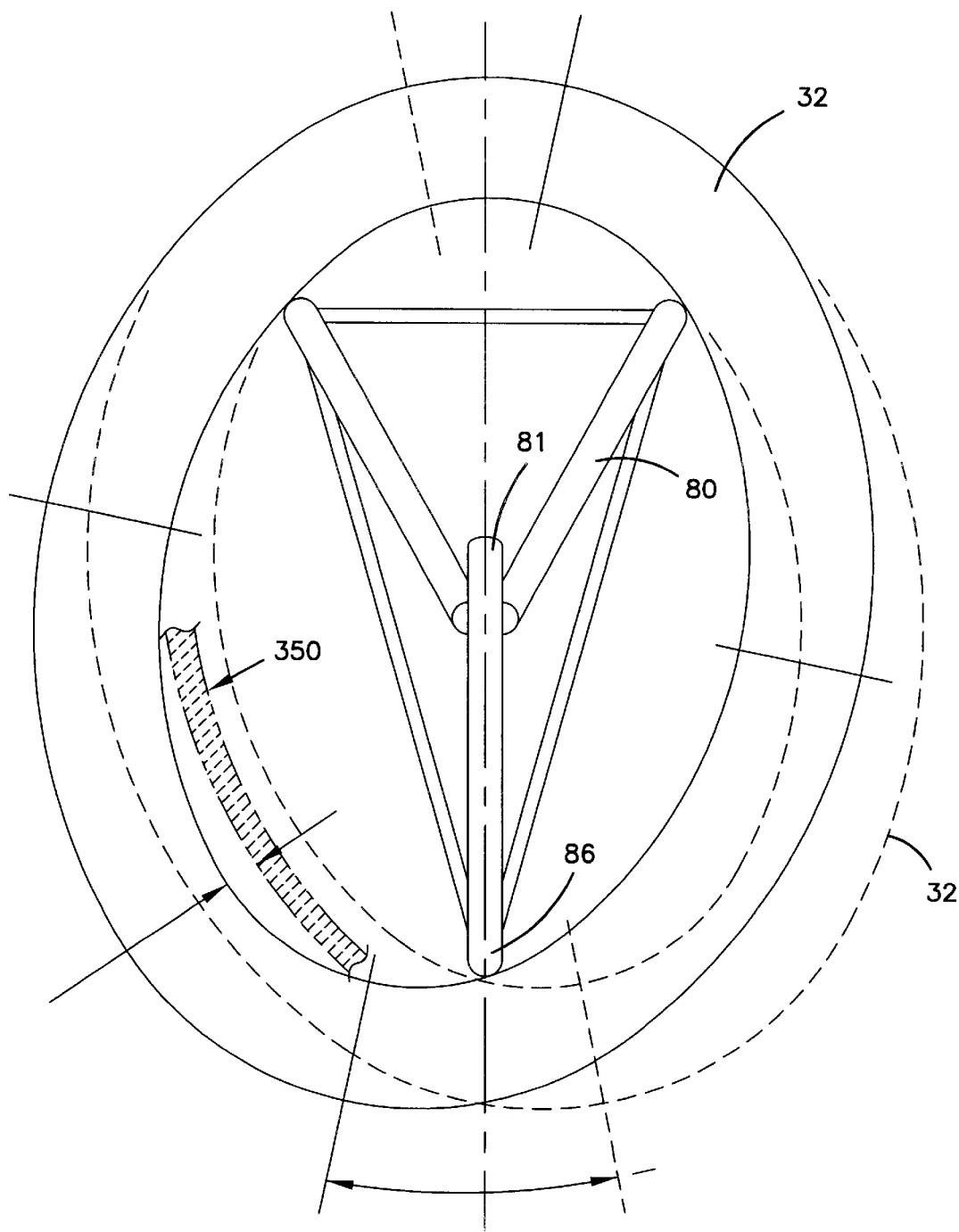
FIG. 14 is a front view of a filter construction without an alignment element.

When multiple filter elements that are not circular in cross section are placed on a single yoke, a misalignment of adjacent filter elements can occur. FIG. 14 is a front view of a yoke 80 and filter elements 32 for illustration of this misalignment. The solid oval lines represent a first filter element 32 closest to the cover 100 . The dotted oval lines represent a second filter element 32 adjacent but behind the first filter element 32. As can be seen by FIG. 14, the two filter elements 32 are misaligned resulting in failure of the gasket 350 to contact both adjacent filter elements 32. This misalignment can result in air leakage between adjacent filter elements.

Figure 15:
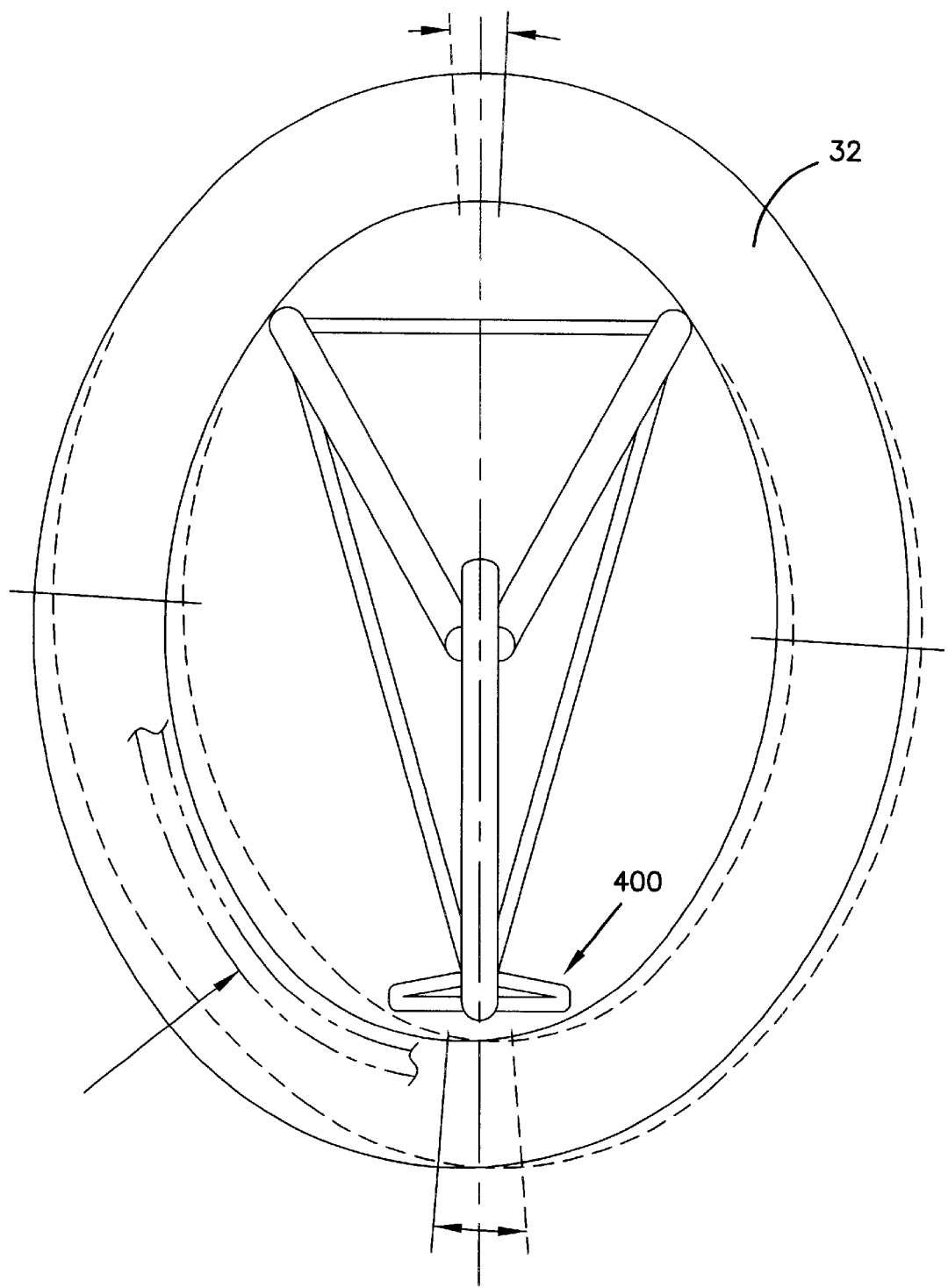
FIG. 15 is a front view of a filter construction with an alignment element according to the principles of the present invention.

A guide clip 400 for minimizing misalignment of filter elements is provided in FIG. 15. The preferred embodiment guide clip 400 is made of formed steel rod and is attached to the bottom rod 86 of the yoke 80 by welding. The guide clip 400 could also be made of thin steel plate or spring steel. As can be seen in FIG. 15 the guide clip is preferably located to friction fit with the inside of the filter element 32 at the point of elongation (i.e., the point at which the distance from the center of the filter element to the inside surface of the filter element is the greatest) of the filter element. The friction fit of the guide clip with the inside surface of the filter element prevents the filter element from rotating around the yoke.

The guide clip 400 overlaps the two stacked filter elements 32. Therefore, a filter construction requires one less guide clip than the number of filter elements in that filter construction (i.e. on that particular yoke). For example, if there are three filter elements on a yoke, then two guide clips would be utilized.

Figure 16:
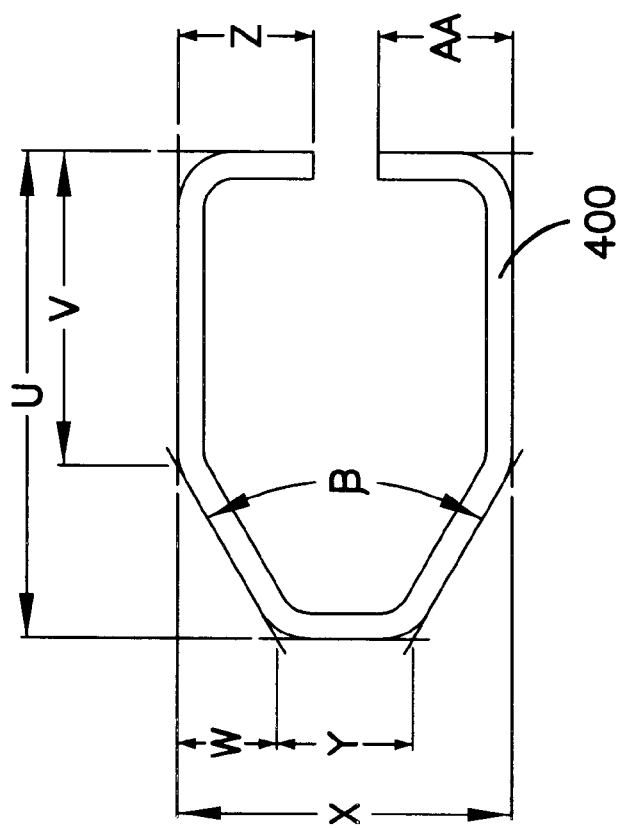
FIG. 16 is a top view of an alignment element according to the principles of the present invention.
Figure 17:
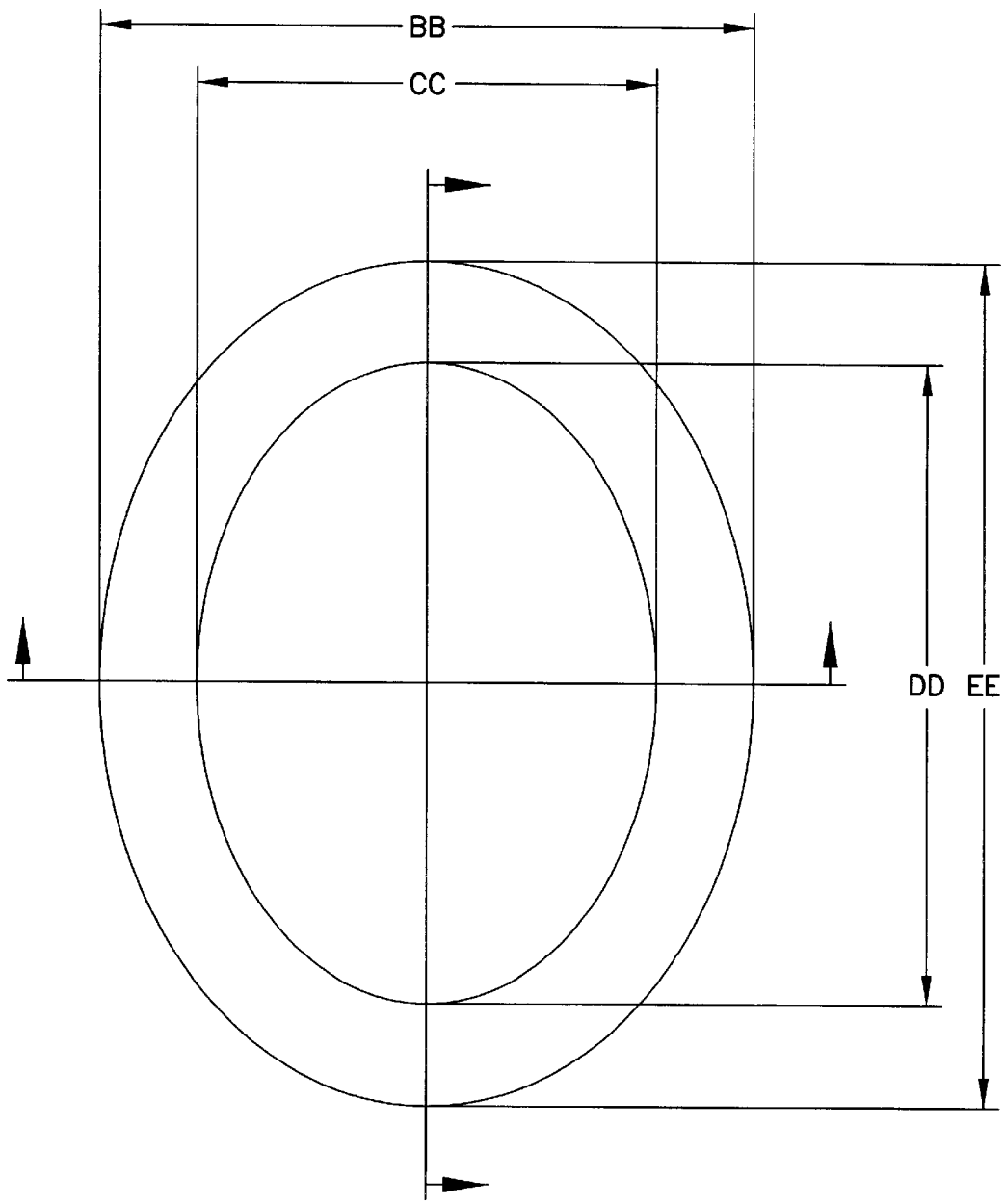
FIG. 17 is a front cross sectional view of a filter according to the principles of the present invention.

FIGS. 9–13 illustrate additional views of the preferred embodiment of the yoke 80 and parts thereof. FIG. 16 is a top view of guide member 400. FIG. 17 is a cross sectional view of an oval filter element 32. In association with the preferred embodiment, particular dimensions will now be provided in the below table. These dimensions are in no way limiting to the scope or breadth of the invention disclosed herein. Many other dimensions, shapes, and configurations are within the scope of this invention. The dimensions provided are one example for use in conjunction with an air filter assembly 10 utilizing two oval filter elements 32 per yoke 80. The dimensions are provided in inches and in centimeters. The dimensions for angles are in degrees.

| Reference letter from Drawing Figures | Dimension (inches) (degrees in case of an angle) | Dimension (centimeters) |
|---|---|---|
| a | 2.50 | 6.35 |
| b | 5.00 | 12.7 |
| c | 8.916 | 22.64 |
| d | 2.06 | 5.23 |
| e | 1.62 | 4.11 |
| f | 49.43 | 125.55 |
| g | 5.16 | 13.10 |
| h | 26.50 | 67.31 |
| i | 9.70 | 24.63 |
| j | 9.36 | 23.77 |
| k | 5.44 | 13.81 |
| l | 1.62 | 4.11 |
| m | 49.43 | 125.55 |
| n | 5.22 | 13.26 |
| o | 0.44 | 1.12 |
| p | 1.01 | 2.57 |
| q | 1.62 | 4.11 |
| r | 49.43 | 125.55 |
| s | 5.50 | 13.97 |
| t | 0.62 | 1.57 |
| u | 3.41 | 8.66 |
| v | 2.20 | 5.59 |
| w | 0.70 | 1.78 |
| x | 2.31 | 5.87 |
| y | 0.91 | 2.31 |
| z | 0.93 | 2.36 |
| aa | 0.93 | 2.36 |
| bb | 11.36 | 28.85 |
| cc | 7.98 | 20.27 |
| dd | 10.98 | 27.89 |
| ee | 14.36 | 36.47 |
| α | 20 degrees | |
| β | 60 degrees | |
| θ | 72 degrees | |

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size and arrangement of parts within the principles of the disclosure to the full extent indicated by the broad general meaning of the terms in which the appended claims are expressed.

We claim:

1. A filter construction for attachment to a housing comprising:
   (a) a yoke having a first end and a second end opposite the first end, wherein the first end is configured to be attached to a housing, and the second end comprises a keeper;
   (b) a filter supported by the yoke, the filter including a first end and a second end opposite the first end, wherein the second end of the filter defines an opening; and
   (c) a cover comprising:
      (i) a plate for covering the opening in the second end of the filter;
      (ii) a tightening member connected to the plate; and
      (iii) a catch having a first end movably connected to the tightening member, and the catch having a second end configured to engage the keeper, wherein the tightening member can be adjusted to change the distance between the catch and the plate, wherein the plate can be caused to seal the opening by engaging the catch with the keeper and utilizing the tightening member to reduce the distance between the plate and the keeper.

2. The filter construction of claim 1 wherein the second end of the yoke further comprises a first guide surface and a second guide surface wherein the catch can be guided into engagement with the keeper by the first and second guide surfaces.

3. The filter construction of claim 2 wherein the first and second guide surfaces comprise first and second rods respectively, wherein the first and second rods are coupled to the yoke.

4. The filter construction of claim 1 wherein the keeper comprises a rod coupled to the yoke wherein the rod has an end.

5. The filter construction of claim 4 wherein the end of the rod is bent in the direction away from the plate.

6. The filter construction of claim 4 wherein the second end of the catch comprises an eye bolt defining a hole wherein the eye bolt is engaged with the rod when the rod is inserted through the hole defined by the eye bolt.

7. The filter construction of claim 1 wherein the yoke comprises a first, second and third rods wherein each of the first, second and third rods include a first end and a second end, wherein the first ends of the first, second and third rods are the first end of the yoke, and wherein the second end of the first rod is the keeper.

8. The filter construction of claim 1 wherein the tightening member comprises an over center clamp.

9. The filter construction of claim 1 wherein the tightening member comprises a wing nut coupled to the plate, wherein the wing nut defines an aperture that is internally threaded, and wherein the first end of the catch is threaded and received by the threaded aperture of the wing nut.

10. An air filter assembly comprising:
   (a) a housing including an air inlet, an air outlet, a spacer wall separating the housing into a filtering chamber and a clean air chamber; the spacer wall having a first air flow aperture therein;
   (b) a first filter construction positioned in the filtering chamber and in air flow communication with the first air flow aperture in the spacer wall; the first filter construction comprising:
      (i) a yoke having a first end and a second end opposite the first end, wherein the first end is coupled to the spacer wall, and the second end comprises a keeper;
      (ii) a filter supported by the yoke, the filter defining an opening extending through the filter from a first end to a second end opposite the first end, wherein the first end of the filter is positioned adjacent to the first air flow aperture in the spacer wall such that there is air flow communication between the opening in the first end of the filter and the air flow aperture in the spacer wall; and
      (iii) a cover comprising:
         (A) a plate for covering the opening in the second end of the filter;
         (B) a tightening member connected to the plate; and
         (C) a catch having a first end movably connected to the tightening member, and the catch having a second end configured to engage the keeper, wherein the tightening member can be adjusted to change the distance between the catch and the plate, wherein the plate can be caused to seal the opening in the second end of the filter by engaging the catch with the keeper and utilizing the tightening member to reduce the distance between the plate and the keeper.

11. The filter assembly of claim 10 wherein the second end of the yoke further comprises a first guide surface and a second guide surface wherein the catch can be guided into engagement with the keeper by the first and second guide surfaces.

12. The filter assembly of claim 11 wherein the first and second guide surfaces comprise first and second rods respectively, wherein the first and second rods are coupled to the yoke.

13. The filter assembly of claim 10 wherein the keeper comprises a rod coupled to the yoke wherein the rod has an end.

14. The filter assembly of claim 13 wherein the end of the rod is bent in the direction away from the plate.

15. The filter assembly of claim 13 wherein the second end of the catch comprises an eye bolt defining a hole wherein the eye bolt is engaged with the rod when the rod is inserted through the hole defined by the eye bolt.

16. The filter assembly of claim 10 wherein the yoke comprises a first, second and third rods wherein each of the first, second and third rods include a first end and a second end, wherein the first ends of the first, second and third rods are the first end of the yoke, and wherein the second end of the first rod is the keeper.

17. The filter assembly of claim 10 wherein the tightening member comprises an over center clamp.

18. The filter assembly of claim 10 wherein the tightening member comprises a wing nut coupled to the plate, wherein the wing nut defines an aperture that is internally threaded, and wherein the first end of the catch is threaded and received by the threaded aperture of the wing nut.

19. The filter assembly of claim 10 wherein the filter comprises two or more filter elements.

20. The filter assembly of claim 10 further comprising a second filter construction.

21. A method of accessing an air filter in an air filter assembly comprising the steps of:
   (a) removing a cover from the air filter assembly wherein the air filter assembly comprises:
      (i) a housing including an air inlet, an air outlet, a spacer wall separating the housing into a filtering chamber and a clean air chamber; the spacer wall having a first air flow aperture therein;
      (ii) a first filter construction positioned in the filtering chamber and in air flow communication with the first air flow aperture in the spacer wall; the first filter construction comprising:
         (A) a yoke having a first end and a second end opposite the first end, wherein the first end is coupled to the spacer wall, and the second end comprises a keeper;
         (B) a filter supported by the yoke, the filter defining an opening extending through the filter from a first end to a second end opposite the first end, wherein the first end of the filter is positioned adjacent to the first air flow aperture in the spacer wall such that there is air flow communication between the opening in the first end of the filter and the air flow aperture in the spacer wall; and
         (C) a cover comprising:
            (I) a plate for covering the opening in the second end of the filter;
            (II) a tightening member connected to the plate; and
            (III) a catch having a first end movably connected to the tightening member, and the catch having a second end configured to engage the keeper, wherein the tightening member can be adjusted to change the distance between the catch and the plate, wherein the plate can be caused to seal the opening in the second end of the filter by engaging the catch with the keeper and utilizing the tightening member to reduce the distance between the plate and the catch;
   (b) accessing the filter; and
   (c) sealing the opening in the second end of the filter with the cover.

22. The method of claim 21 wherein the accessing the filter step comprises:
   (a) removing the filter from the air filter assembly;
   (b) determining if a replacement of the filter is necessary; and
   (c) returning the filter to the air filter assembly.

23. The method of claim 21 wherein the accessing the filter step comprises replacing the filter with a second filter.

* * * * *